Dec. 19, 1950 K. ERIKSEN ET AL Re. 23,310

STAND-OFF INSULATOR

Original Filed Feb. 14, 1948

INVENTOR.
KENNETH ERIKSEN
CARL W. CONCELMAN

BY John R. Harvey

ATTORNEY

Reissued Dec. 19, 1950

Re. 23,310

UNITED STATES PATENT OFFICE 23,310

STANDOFF INSULATOR

Kenneth Eriksen and Carl W. Concelman, Brookfield, Conn., assignors to Hazeltine Research, Inc., Chicago, Ill., a corporation of Illinois Original No. 2,476,407, dated July 19, 1949, Serial No. 8,414, February 14, 1948. Application for reissue July 15, 1950, Serial No. 173,964

10 Claims. (Cl. 174—158)

Figure 1:
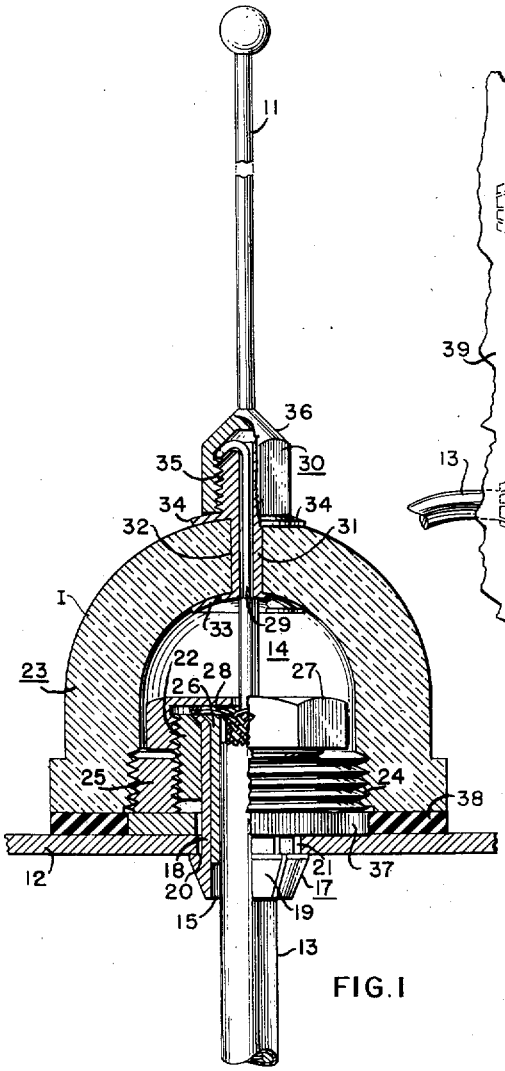

Matter enclosed in heavy brackets [ ] appears in the original patent but forms no part of this reissue specification; matter printed in italics indicates the additions made by reissue

The present invention relates to stand-off insulators and, particularly, to such insulators adapted to support an antenna in spaced relation to a conductive surface, such as the body of an automobile.

Stand-off insulators heretofore proposed for mounting antennas on thin rigid surfaces, such as the top or side of an automobile, have required the use of an excessively complex construction involving an unduly large number of structural components. They have thus been not only unduly expensive to manufacture but also have been expensive to install since they require an excessive installation time. When the antenna is mounted on the top or side of an automobile, the previously proposed arrangements have frequently made it necessary to mutilate a significant portion of an inner protective and decorative fabric, particularly when the antenna is mounted on the top of the automobile.

It is an object of the present invention, therefore, to provide a new and improved stand-off insulator which avoids one or more of the disadvantages and limitations of prior such insulators.

It is a further object of the invention to provide a stand-off insulator which is very simple in construction and is easily, readily and quickly installed with both a minimum of effort and of the number of tools required.

It is an additional object of the invention to provide a new and improved stand-off insulator which when mounted on a ground plane may be installed from one side only thereof.

It is still an additional object of the invention to provide, in an antenna installation for a vehicle, a stand-off insulator having a novel securing means.

It is yet another object of the invention to provide a stand-off insulator which employs a minimum number of simple and inexpensive electrical and mechanical parts.

In accordance with the invention, a stand-off insulator for supporting an antenna in insulated spaced relation to the surface of a conductive member [of sheet material] comprises an externally threaded mounting structure which includes a projecting portion provided [adjacent one end thereof] with [a plurality of peripherally] spaced latch elements. These latch elements are [transversely] movable to permit the insertion of the one end of the projecting portion through an aperture in the conductive member and thereafter to latch the projecting portion in the aperture. The stand-off insulator also comprises a [insulator] structure which includes

[means for securing the insulator structure to the mounting structure. One of these structures includes] a member threaded onto the threaded mounting structure for clamping the conductive member between the latch elements and the last-mentioned member. *One of the aforesaid structures of the stand-off insulator includes means for supporting the antenna in insulated spaced relation to the conductive member.* [The stand-off insulator further includes means for supporting the antenna from the insulator structure.]

For a better understanding of the present invention, together with other and further objects thereof, reference is had to the following description taken in connection with the accompanying drawing, and its scope will be pointed out in the appended claims.

Figure 3:
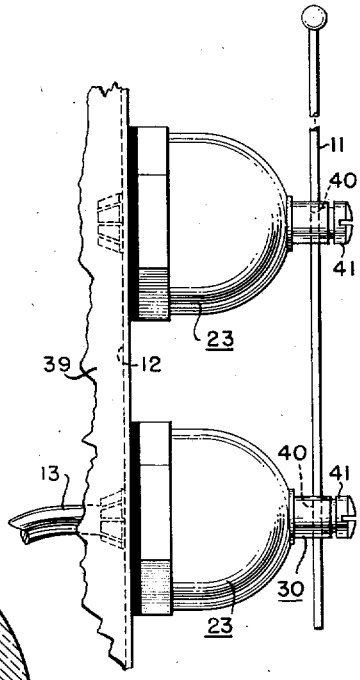
Figure 2:
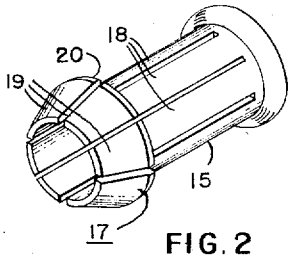

In the drawing, Fig. 1 is an elevational view partially in cross section showing a stand-off insulator embodying the invention; Fig. 2 is a detail view of a sleeve element utilized in the insulator arrangement; and Fig. 3 illustrates a slightly modified form of the present invention.

Referring now more particularly to Fig. 1 of the drawing, the stand-off insulator is utilized to support an antenna 11 in insulated spaced relation to the surface of a conductive member 12 of sheet material which may, for example, be the top of an automobile. A coaxial transmission line 13 leading from a wave-signal apparatus, not shown, is coupled to the antenna 11. The insulator arrangement comprises a mounting structure 14 which includes a hollow cylindrical metal sleeve 15, the constructional features of which are more clearly apparent from Fig. 2 of the drawing, having on one end thereof a collar 17 of frusto-conical configuration. The sleeve 15 with its collar 17 is longitudinally slotted over the major portion of its length to provide a plurality of circumferentially spaced resilient fingers 18. The slotted segments of the collar 17 thus provide on the remote end of each of the fingers 18 is wedge-shaped latch element 19 with a shoulder 20 facing the other end of the sleeve. The fingers 18 are resiliently movable transversely of a longitudinal axis common to the fingers to permit the insertion of the fingers 18 through an aperture 21 provided in the conductive sheet member 12. An externally threaded sleeve member 22 is press fitted over that end of the sleeve 15 which is remote from the latch elements 19.

The stand-off insulator also includes a hollow insulator structure 23 having means for securing the insulator structure 23 to the mounting structure 14. The means last mentioned may, for example, comprise internal threads 24 provided on a dome-shaped insulator I. One of the structures 14 and 23 includes means movable along a longitudinal axis of the mounting structure 14 for causing the latch elements 19 firmly to secure the projecting portion of the mounting structure including the fingers 18 thereof in the aperture 21. In the arrangement disclosed, the means last mentioned is a part of the mounting structure 14 and comprises a clamping member 25 internally and externally threaded, this member being threaded onto the sleeve member 22 to clamp the conductive member 12 between the shoulders 20 of the latch elements 19 and the clamping member 25. The elements 22 and 25 each have provision made for holding them with a wrench in order that the member 25 may be suitably tightened down. The mounting structure 14 also includes a hollow sleeve member 26, which is insertable into the hollow projecting portion of the sleeve 15 after the insertion of this portion within the aperture 21, to restrain the latch elements 19 against further transverse movement.

The transmission line 13 extends through the sleeve 15 of the mounting structure 14 and an internally threaded and apertured conductive cap member 27 is threaded onto the sleeve member 22 of the mounting structure mechanically to clamp and electrically to connect the outer conductor 28 of the coaxial transmission line 13 to the mounting structure.

The internally threaded insulator I is threaded onto the clamping member 25 to secure the insulator structure 23 to the mounting structure 14. The coaxial transmission line 13 has an inner conductor 29 which extends through the apertured cap 27 in insulated relation therewith. Means, comprising a coupling structure 30, is provided for supporting the antenna 11 on the insulator structure 23 and for electrically connecting the inner conductor 29 of the transmission line to the antenna. The coupling structure 30 comprises a inner conductive sleeve 31 which is secured within an axial aperture 32 of the insulator I. The sleeve 31 has a flange 33 at one end to engage the interior surface of the insulator I and a flange 34 intermediate its ends to engage the exterior surface of the insulator I. An outer end of the sleeve 31 carries a threaded portion 35 for receiving an internally threaded conductive cap member 36 which is integral with the antenna 11 and secures the latter to the coupling structure 30. The sleeve 31 is radially slotted to receive the bent-over end of the transmission-line inner conductor 29 and also has an external circumferential groove at this end so that the end of the conductor 29 can be wound around to lie in this groove and thereby be securely clamped between the sleeve 31 and cap member 36. The coupling structure 30 thus not only serves to support the antenna 11 on the insulator structure 23, but also serves electrically to connect the inner conductor 29 of the transmission line 13 to the antenna 11.

The mounting structure 14 preferably includes a metallic washer 37 interposed between the clamping member 25 and the upper side of the conductive member 12. A rubber gasket 38 preferably is interposed between the broad base of the insulator I and the top surface of the conductive member 12 to provide a watertight joint therebetween.

The method of assembly of the stand-off insulator is best described by starting with the mounting structure 14. The hole 21 is first drilled or otherwise formed in the conductive member 12. After assembling the washer 37 on the end of the metal sleeve 15, the latter is then inserted into the hole 21 sufficiently far that the shoulders 20 of the latch elements 17 engage the underside of the member 12. The sleeve member 26 is next forced downwardly into the sleeve 15 to prevent further inward flexing of the flexible fingers 18. The clamping member 25 is now threaded onto the externally threaded member 22 firmly to clamp the shoulders 20 of the latching element 17 against the underside of the conductive member 12. Then the coaxial transmission line 13 is prepared for insertion upwardly within the sleeve 26, the outer conductor 28 of the transmission line being bent outwardly over the top portions of the elements 18, 22, and 26. The inner conductor 29, with its insulation thereon, is now inserted through the aperture of the cap 27 and the latter is threaded into the member 22 to clamp the line outer conductor 28 to the mounting structure 14.

After positioning the rubber gasket 38 and inserting the inner conductor 29 of the transmission line through the sleeve 31 of the coupling structure 30, the insulator structure 23 is next screwed onto the member 25 and tightened down against the member 12. The internal conductor 29 is next wound around the groove in the end of the sleeve 31 and the cap 36 is screwed onto the portion 35 of the latter to complete the assembly.

The novel stand-off insulator described provides a rigid construction for supporting an antenna in insulated spaced relation to the surface of a conductive member, ensures a positive electrical connection between the external conductor of a coaxial cable and the conductive member, and further ensures a positive electrical connection between the inner conductor of the transmission line and the antenna. All the parts of the assembly are simple in construction, easily installed and readily replaceable. The broad-base insulator structure 23 provides ample rigidity for the antenna 11 in a transverse direction.

Two stand-off insulators having substantially the construction above described may be utilized to support a vertical antenna in insulated spaced relation to the side 39 of an automobile as shown in Fig. 3, elements of Fig. 3, which correspond to similar elements of Fig. 1 being designated by the same reference numerals. In the instant arrangement, the coupling structure 30 is formed with a transverse bore 40 and a setscrew 41 may be used to hold the antenna 11 in a fixed position relative to the insulator structure 23.

It will be apparent from the above description of the invention that a stand-off insulator embodying the invention has the advantage that it is possible to mount an antenna on a conductive surface by operations performed from one side only of the latter. Such installation requires a minimum number of simple tools and can be accomplished in a very short period of time by an unskilled person. The stand-off insulator of the present invention has the additional advantage that it not only provides a very rigid mounting for an antenna but one which may be readily waterproofed. Further, positive and secure electrical connections between an associated transmission line and both the antenna and its supporting conductive surface member are assured.

The stand-off insulator is simple in construction and involves only a comparatively few inexpensive components easily manufactured in quantity.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A stand-off insulator for supporting an antenna in insulated spaced relation to the surface of a conductive member of sheet material comprising, a mounting structure including a projecting portion provided adjacent one end thereof with a plurality of peripherally spaced latch elements transversely movable to permit the insertion of said one end of said projecting portion through an aperture in said conductive member and thereafter to latch said projecting portion in said aperture, each of said latch elements including a wedge-shaped portion having a shoulder facing the other end of said projecting portion, said structure including longitudinally movable means for clamping said conductive member between said means and the shoulders of said latch elements, and an insulator structure including means for attachment to said mounting structure, and means for supporting said antenna from said insulator structure.

2. A stand-off insulator for supporting an antenna in insulated spaced relation to the surface of a conductive member of sheet material comprising, a mounting structure including a sleeve longitudinally slotted at one end thereof and having at said one end a longitudinally slotted collar of frusto-conical configuration to provide a plurality of circumferentially spaced resilient fingers each having on said one end thereof a wedge-shaped latch element with a shoulder portion facing the other end of said sleeve and movable transversely to permit the insertion of said fingers in an aperture of said conductive member and thereafter to latch said fingers in said aperture, an insulator structure including means for attachment to said mounting structure, one of said structures including means for causing said latch elements firmly to secure said fingers in said aperture, and means for supporting said antenna from said insulator structure.

3. A stand-off insulator for supporting an antenna in insulated spaced relation to the surface of a conductive member of sheet material comprising, an externally threaded mounting structure including a projecting portion provided adjacent one end thereof with a plurality of peripherally spaced latch elements transversely movable to permit the insertion of said one end of said projecting portion through an aperture in said conductive member an thereafter to latch said projecting portion in said aperture, an insulator structure including means for attachment to said mounting structure, one of said structures including a member threaded onto said threaded mounting structure for clamping said conductive member between said latch elements and said last-mentioned member, and means for supporting said antenna from said insulator structure.

4. A stand-off insulator for supporting an antenna in insulated spaced relation to the surface of a conductive member of sheet material comprising, an externally threaded mounting structure including a projecting portion provided adjacent one end thereof with a plurality of peripherally spaced latch elements transversely movable to permit the insertion of said one end of said projecting portion through an aperture in said conductive member and thereafter to latch said projecting portion in said aperture, said mounting structure including an externally and internally threaded clamping member threaded onto said threaded portion of said mounting structure for clamping said conductive member between said latch elements and said last-mentioned member, an internally threaded insulator structure threaded onto said clamping member for attachment to said mounting structure, and means for supporting said antenna from said insulator structure.

5. A stand-off insulator for supporting an antenna in insulated spaced relation to the surface of a conductive member, and for coupling a coaxial transmission line to said antenna, comprising: an externally threaded, hollow, conductive, mounting structure including a hollow projecting portion provided adjacent one end thereof with a plurality of peripherally spaced latch elements transversely movable to permit the insertion of said one end of said projecting portion through an aperture in said conductive member and thereafter to latch said projecting portion in said aperture; said structure including an externally and internally threaded clamping member threaded onto said mounting structure for clamping said conductive member between said latch elements and said clamping member; an internally threaded insulator structure threaded onto said clamping member for attachment to said mounting structure; an internally threaded and apertured conductive cap member threaded onto said clamping member and adapted electrically and mechanically to connect to said mounting structure the outer conductor of a coaxial transmission line which extends through said hollow portion thereof; said transmission line having an inner conductor extending through said apertured cap in insulated relation therewith; and means for supporting said antenna on said insulator structure and for electrically connecting said inner conductor to said antenna.

*6. A stand-off insulator for supporting an antenna in insulated spaced relation to the surface of a conductive member comprising: an externally threaded mounting structure including a projecting portion provided with spaced latch elements movable to permit the insertion of said projecting portion through an aperture in said conductive member and thereafter to latch said projecting portion in said aperture; and a structure including a member threaded onto said threaded mounting structure for clamping said conductive member between said latch elements and said last-mentioned member; one of said structures including means for supporting said antenna in insulated spaced relation to said conductive member.*

*7. A stand-off insulator for supporting an antenna in insulated spaced relation to the surface of a conductive member comprising: an externally threaded mounting structure including a projecting portion provided with a plurality of peripherally spaced latch elements movable to permit the insertion of said projecting portion through an aperture in said conductive member and there-*

*after to latch said projecting portion in said aperture; and a structure including a member threaded onto said threaded mounting structure for clamping said conductive member between said latch elements and said last-mentioned member; one of said structures including means for supporting said antenna in insulated spaced relation to said conductive member.*

*8. A stand-off insulator for supporting an antenna in insulated spaced relation to the surface of a conductive member comprising: an externally threaded mounting structure including a projecting portion provided with spaced latch elements movable to permit the insertion of said projecting portion through an aperture in said conductive member and thereafter to latch said projecting portion in said aperture; a structure including a member threaded onto said threaded mounting structure for clamping said conductive member between said latch elements and said last-mentioned member; and an internally threaded and apertured conductive cap member threaded onto said mounting structure and adapted electrically and mechanically to connect to said mounting structure the outer conductor of a coaxial transmission line which extends through said mounting structure; said second-mentioned structure including means for supporting said antenna in insulated spaced relation to said conductive member and including means for electrically connecting the inner conductor of said transmission line to said antenna.*

*9. A stand-off insulator for supporting an antenna in insulated spaced relation to the surface of a conductive member comprising: an externally threaded hollow mounting structure including a projecting portion provided with a plurality of peripherally spaced latch elements movable to permit the insertion of said projecting portion through an aperture in said conductive member and thereafter to latch said projecting portion in said aperture; an insulator structure including a member threaded onto said threaded mounting structure for clamping said conductive member between said latch elements and said last-mentioned member; and an internally threaded and apertured conductive cap member threaded onto said mounting structure and adapted electrically and mechanically to connect to said mounting structure the outer conductor of a coaxial transmission line which extends through said mounting structure; said insulator structure including means for supporting thereon said antenna in insulated spaced relation to said conductive member and for electrically connecting the inner conductor of said transmission line to said antenna.*

*10. A stand-off insulator for supporting an antenna in insulated spaced relation to the surface of a conductive member comprising: an externally threaded hollow mounting structure including a projecting portion provided with spaced latch elements movable to permit the insertion of said projecting portion through an aperture in said conductive member and thereafter to latch said projecting portion in said aperture; an insulator structure including a member threaded onto said threaded mounting structure for clamping said conductive member between said latch elements and said last-mentioned member; and an internally threaded and apertured conductive cap member threaded onto said mounting structure and adapted electrically and mechanically to connect to said mounting structure the outer conductor of a coaxial transmission line which extends through said mounting structure; said insulator structure including means for detachably supporting thereon said antenna in insulated spaced relation to said conductive member and for electrically connecting the inner conductor of said transmission line to said antenna.*

KENNETH ERIKSEN.
CARL W. CONCELMAN.

REFERENCES CITED

The following references are of record in the file of this patent:

UNITED STATES PATENTS

| Number | Name | Date |
|---|---|---|
| 1,910,226 | Austin | May 23, 1933 |
| 2,219,327 | Miller | Oct. 29, 1940 |
| 2,420,826 | Irrgang | May 20, 1947 |
| 2,424,804 | De Swart | July 27, 1947 |
| 2,434,638 | Bryers | Jan. 20, 1948 |